(12) United States Patent
Pan et al.

(10) Patent No.: US 12,423,358 B2
(45) Date of Patent: Sep. 23, 2025

(54) METHOD AND DEVICE FOR INFORMATION PRESENTING

(71) Applicant: NEC CORPORATION, Tokyo (JP)

(72) Inventors: Zheng Pan, Beijing (CN); Lu Feng, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/598,202

(22) Filed: Mar. 7, 2024

(65) Prior Publication Data

US 2024/0320270 A1 Sep. 26, 2024

(30) Foreign Application Priority Data

Mar. 21, 2023 (CN) .......................... 202310282745.0

(51) Int. Cl.
*G06F 16/9038* (2019.01)
*G06F 16/903* (2019.01)

(52) U.S. Cl.
CPC .... *G06F 16/9038* (2019.01); *G06F 16/90335* (2019.01)

(58) Field of Classification Search
USPC ........................................................ 707/722
See application file for complete search history.

(56) References Cited

U.S. PATENT DOCUMENTS

| | | | |
|---|---|---|---|
| 9,881,077 B1* | 1/2018 | Alfonseca | G06F 16/24578 |
| 10,978,184 B2 | 4/2021 | Sorenson | |
| 2011/0055426 A1* | 3/2011 | Lakshmanan | G06F 9/5066 |
| | | | 709/242 |
| 2018/0309637 A1* | 10/2018 | Gill | H04L 41/40 |
| 2021/0026888 A1* | 1/2021 | Pang | G06F 16/903 |
| 2021/0191506 A1 | 6/2021 | Wang et al. | |

(Continued)

FOREIGN PATENT DOCUMENTS

| | | |
|---|---|---|
| CN | 111538872 A | 8/2020 |
| JP | 2008-203964 A | 9/2008 |

(Continued)

OTHER PUBLICATIONS

Notice of Allowance dated Mar. 28, 2025 from the Unites States Patent and Trademark Office in U.S. Appl. No. 18/600,008.

(Continued)

*Primary Examiner* — Tony Mahmoudi
(74) *Attorney, Agent, or Firm* — Sughrue Mion, PLLC

(57) ABSTRACT

According to embodiments of the present disclosure, a method and device for information presenting are provided. The method includes receiving a query for an event evolutionary graph, the query indicating at least a target event to be searched. The method further includes presenting, as a result of the query, a target event evolutionary graph comprising a plurality of nodes and at least one directed edge connecting the plurality of nodes, the plurality of nodes representing the target event and one or more events associated with the target event respectively, and the at least one directed edge representing an event relationship between events represented by connected nodes respectively. The method further includes presenting, for at least one node in the plurality of nodes, time information of at least one event represented by the at least one node, respectively.

14 Claims, 9 Drawing Sheets

(56) References Cited

U.S. PATENT DOCUMENTS

| | | |
|---|---|---|
| 2022/0138587 A1 | 5/2022 | Chen |
| 2023/0052225 A1 | 2/2023 | Edington et al. |
| 2023/0073220 A1* | 3/2023 | Del Villar ........... G06F 3/04817 |
| 2023/0186059 A1 | 6/2023 | Laszlo et al. |

FOREIGN PATENT DOCUMENTS

| | | |
|---|---|---|
| JP | 2013-210868 A | 10/2013 |
| JP | 2018-22248 A | 2/2018 |
| JP | 2018-523862 A | 8/2018 |
| JP | 2019-117442 A | 7/2019 |
| WO | 2020/129905 A1 | 6/2020 |

OTHER PUBLICATIONS

Office Action issued Jul. 1, 2025 in Japanese Application No. 2024-043176.
Office Action issued Jul. 8, 2025 in Japanese Application No. 2024-041860.

\* cited by examiner

METHOD AND DEVICE FOR INFORMATION PRESENTING

CROSS-REFERENCE

This application claims the benefit of Chinese Patent Application No. 202310282745.0, filed on Mar. 21, 2023, entitled "METHOD AND DEVICE FOR INFORMATION PRESENTATION", the entirety of which is hereby incorporated herein by reference.

FIELD

The example embodiments of the present disclosure generally relate to the field of computers, and more particularly, to a method and device for information presenting.

BACKGROUND

With the development of network technology and multimedia technology, the amount of news is increasing exponentially every day, and there is a large amount of repetitive news. Generally speaking, news events do not occur in isolation. Users may want to understand the causes and effects of events or further understand the trend of events through historical events, so as to anticipate the possible impact of current events. For a user, the process of seeking and filtering event-related information is very cumbersome. Therefore, a solution that can automatically sort, refine, and provide insight into various news is expected.

SUMMARY

In a first aspect of the present disclosure, a method of information presenting is provided. The method comprises: receiving a query for an event evolutionary graph, the query indicating at least a target event to be searched; presenting, as a result of the query, a target event evolutionary graph comprising a plurality of nodes and at least one directed edge connecting the plurality of nodes, the plurality of nodes representing the target event and one or more events associated with the target event respectively, and the at least one directed edge representing an event relationship between events represented by connected nodes respectively; and presenting, for at least one node in the plurality of nodes, time information of at least one event represented by the at least one node, respectively.

In a second aspect of the present disclosure, an electronic device is provided. The electronic device comprises at least one processing circuit. The at least one processing circuit is configured to: receive a query for an event evolutionary graph, the query indicating at least a target event to be searched; present, as a result of the query, a target event evolutionary graph comprising a plurality of nodes and at least one directed edge connecting the plurality of nodes, the plurality of nodes representing the target event and one or more events associated with the target event respectively, and the at least one directed edge representing an event relationship between events represented by connected nodes respectively; and present, for at least one node in the plurality of nodes, time information of at least one event represented by the at least one node, respectively.

In some embodiments of the second aspect, the at least one processing circuit is further configured to: receive a selection of a first node of the plurality of nodes, the first node representing a first event; and in response to the first node being selected, present a time-of-occurrence distribution for the first event, the time-of-occurrence distribution indicating a frequency of occurrence of the first event over a historical time period.

In some embodiments of the second aspect, the at least one processing circuit is further configured to: receive a selection of a first time within the historical time period; and in response to the first time being selected, present one or more media content, occurrence of the first event at the first time being determined from the one or more media content.

In some embodiments of the second aspect, the at least one processing circuit is further configured to: receive a selection of a first directed edge of the at least one directed edge, the first directed edge representing a first event relationship; and in response to the first directed edge being selected, present one or more media content, the first event relationship being determined from the one or more media content.

In some embodiments of the second aspect, the at least one processing circuit is further configured to: present, for a second node in the plurality of nodes, a second time of occurrence of a second event represented by the second node; and present, for a third node in the plurality of nodes, a third time of occurrence of a third event represented by the third node; wherein the second event has a second event relationship with the third event, and a time sequence between the second time and the third time conforms to the second event relationship.

In some embodiments of the second aspect, the query further indicates a time range to be searched, and a time comprised in the time information is within the time range.

In some embodiments of the second aspect, the target event evolutionary graph is determined based on a reference event evolutionary graph, and each node in the reference event evolutionary graph is associated with a time of occurrence of an event represented by the node.

In some embodiments of the second aspect, the at least one processing circuit is further configured to construct the reference event evolutionary graph by: generating an individual event evolutionary graph corresponding to a media content, the individual event evolutionary graph comprising at least a fourth node representing a fourth event, a fifth node representing a fifth event, and a third directed edge representing a third event relationship between the fourth event and the fifth event, the fourth event, the fifth event, and the third event relationship being determined from the media content; determining, based on the media content, a fourth time of occurrence of the fourth event and a fifth time of occurrence of the fifth event; determining a first similarity between the fourth event and a sixth event represented by a sixth node in the reference event evolutionary graph, and a second similarity between the fifth event and a seventh event represented by a seventh node in the reference event evolutionary graph; and updating the reference event evolutionary graph with the fourth time and the fifth time, based on the first similarity, the second similarity, a first threshold, and a second threshold less than the first threshold.

In some embodiments of the second aspect, the at least one processing circuit is further configured to: in response to the first similarity exceeding the first threshold and the second similarity exceeding the first threshold, add, between the sixth node and the seventh node, a directed edge representing the third event relationship; store, in association with the sixth node, the fourth time in the reference event evolutionary graph; and store, in association with the seventh node, the fifth time in the reference event evolutionary graph.

In some embodiments of the second aspect, the at least one processing circuit is further configured to: in response to the first similarity exceeding the first threshold and the second similarity being less than the second threshold, add an eighth node representing the fifth event into the reference event evolutionary graph; add, between the sixth node and the eighth node, a directed edge representing the third event relationship; store, in association with the sixth node, the fourth time in the reference event evolutionary graph; and store, in association with the eighth node, the fifth time in the reference event evolutionary graph.

In some embodiments of the second aspect, the at least one processing circuit is further configured to: in response to the first similarity and the second similarity both being located between the first threshold and the second threshold, add the individual event evolutionary graph to the reference event evolutionary graph; add an indication that the fourth event is similar to the sixth event and an indication that the fifth event is similar to the seventh event to the reference event evolutionary graph; store, in association with the fourth node, the fourth time in the reference event evolutionary graph; and store, in association with the fifth node, the fifth time in the reference event evolutionary graph.

In a third aspect of the present disclosure, an electronic device is provided. The device comprises at least one processing unit; and at least one memory coupled to the at least one processing unit, storing instructions for execution by the at least one processing unit. The instructions when executed by at least one processing unit, cause the device to perform the method of the first aspect.

In a fourth aspect of the present disclosure, a computer-readable storage medium is provided. The computer-readable storage medium stores a computer program thereon, the computer program, can be executed by a processor to implement the method of the first aspect.

It should be understood that the contents described in the content section of the present disclosure are not intended to limit the key features or important features of the embodiments of the present disclosure, nor are they intended to limit the scope of the present disclosure. Other features of the present disclosure will become readily understood from the following description.

BRIEF DESCRIPTION OF THE DRAWINGS

The above and other features, advantages, and aspects of the various embodiments of the present disclosure will become more apparent in conjunction with the accompanying drawings and with reference to the following detailed description. In the drawings, the same or similar reference numerals denote the same or similar elements, wherein.

DETAILED DESCRIPTION

Figure 1:
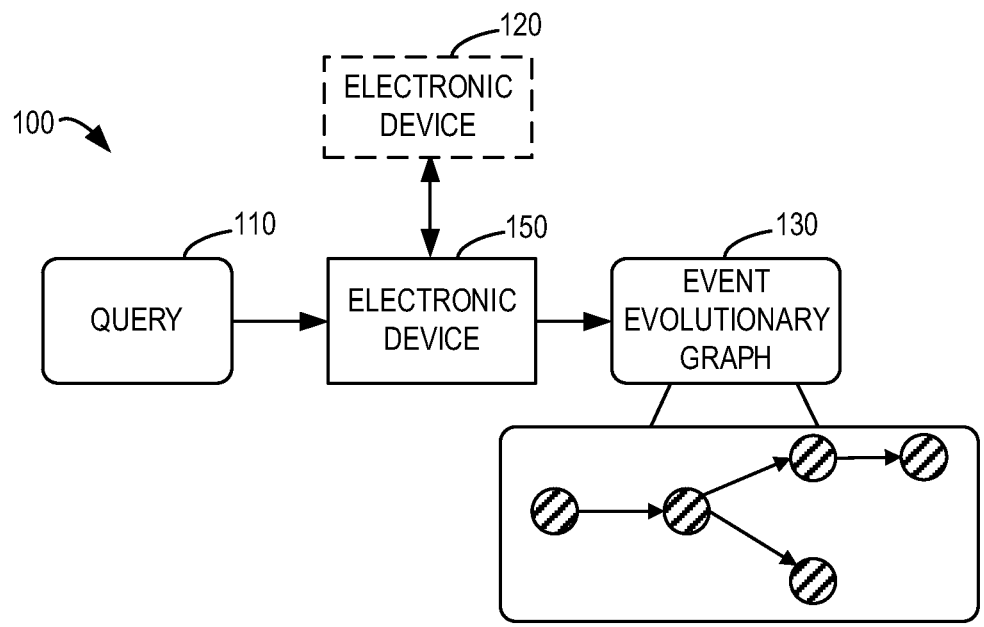
FIG. 1 illustrates a schematic diagram of an example environment in which embodiments of the present disclosure can be implemented.

Embodiments of the present disclosure will be in a more detailed description with reference to the accompanying drawings. Although certain embodiments of the present disclosure are illustrated in the drawings, it should be understood that the present disclosure can be implemented in various forms and should not be construed as limited to the embodiments set forth herein. On the contrary, these embodiments are provided for a more thorough and complete understanding of the present disclosure. It should be understood that the accompanying drawings and embodiments of the present disclosure are for illustrative purposes only and are not intended to limit the scope of protection of the present disclosure.

It should be noted that the titles of any section/sub-section provided herein are not restrictive. Various embodiments are described herein, and any type of embodiment can be comprised under any section/sub-section. In addition, the embodiments described in any section/sub-section can be combined in any way with any other embodiments described in the same section/sub-section and/or different sections/sub-sections.

In the description of embodiments of the present disclosure, the term "comprises", and similar terms should be understood as open-ended inclusion, i.e., "comprises but not limited to". The term "based on" should be understood as "at least partially based on". The term "one embodiment" or "the embodiment" should be understood as "at least one embodiment". The term "some embodiments" should be understood as "at least some embodiments". The following may also comprise other explicit and implicit definitions.

The term "circuit" as used herein may refer to hardware circuitry and/or a combination of hardware circuitry and software. For example, a circuit may be a combination of analog and/or digital hardware circuitry with software/firmware. As another example, a circuit may be any part of a hardware processor with software. The hardware processor comprises a digital signal processor(s), software, and memory(ies), which work together to enable the apparatus to work to perform various functions. In yet another example, a circuit may be a hardware circuit and/or processor, for example, part of a microprocessor or microprocessor, which requires software/firmware for operation, but may not exist when not required for operation. As used herein, the term "circuit" also encompasses only hardware circuitry or processors or a part of hardware circuitry or processors and their (or their) accompanying software and/or firmware implementations.

As used herein, the term "event" refers to a change in an event or state consisting of one or more actions in which one or more event subjects participate in a particular time and space.

Example Environment and Basic Principles

FIG. 1 illustrates a schematic diagram of an example environment 100 in which embodiments of the present disclosure can be implemented. In the environment 100, the electronic device 150 receives a query 110 initiated by a user for an event evolutionary graph. The query 110 indicates at least the event to be searched, also referred to as a target event or event of interest. The electronic device 150 then presents, as a result of the query 110, a target event evolutionary graph 130. As shown in FIG. 1, the target event evolutionary graph 130 comprises a plurality of nodes, each node representing an event. One of these nodes represents the target event, and the other one or more nodes represent the searched events associated with the target event. The target event evolutionary graph 130 also comprises at least one directed edge, each of which represents a relationship between the events represented by the nodes it is connected to, also referred to as the event relationship.

The target event evolutionary graph 130 can be determined based on a larger event evolutionary graph (also referred to as a reference event evolutionary graph). Compared with the target event evolutionary graph 130, the reference event evolutionary graph can be regarded as a global event evolutionary graph. In some embodiments, the reference event evolutionary graph can be constructed for specific domains, for example, the finance domain and semiconductors domain. Alternatively, the reference event evolutionary graph can be constructed across a plurality of domains or can be domain-free. The reference event evolutionary graph can describe the relationships between various different events from a global perspective.

The target event evolutionary graph 130 may be part of the reference event evolutionary graph (also referred to as a subgraph) or may be a variant of a subgraph of the reference event evolutionary graph. In some embodiments, the electronic device 150 may store or access the reference event evolutionary graph. Accordingly, the electronic device 150 may search the reference event evolutionary graph according to the conditions specified by the query 110 to determine and present the target event evolutionary graph 130.

In some other embodiments, as shown in FIG. 1, the electronic device 150 may send the query 110 to an electronic device 120 (e.g., a server device providing an event evolutionary graph searching service) and receive information about the target event evolutionary graph 130 from the electronic device 120. That is, in such embodiment, the search is performed by the electronic device 120 based on the condition specified by the query 110.

In the environment 100, an electronic device 150 may be any type of computing-capable device, comprising a terminal device. The terminal device may be any type of mobile terminal, fixed terminal, or portable terminal, comprising mobile phones, desktop computers, laptop computers, notebook computers, netbook computers, tablet computers, media computers, multimedia tablets, personal communication system (PCS) devices, personal navigation devices, personal digital assistants (PDAs), audio/video player, digital cameras/camcorders, positioning devices, television receivers, radio broadcast receivers, e-book devices, gaming devices, or any combination thereof, comprising accessories and peripherals of these devices, or any combination thereof. The electronic device 120 may be any type of computing-capable device, comprising server devices. The server devices may comprise, for example, computing systems/servers, such as mainframes, Edge Computing nodes, computing devices in cloud environments, and so on.

It should be understood that the structure and function of the environment 100 are described for illustrative purposes only and do not imply any limitation on the scope of the present disclosure. For example, the environment 100 may also comprise the reference event evolutionary graph. In addition, the structure and style of the target event evolutionary graph 130 illustrated in FIG. 1 are exemplary only and are not intended to limit the scope of the present disclosure.

In order to provide the user with the expected query result, it is necessary to search the global event evolutionary graph. With the continuous expansion of the event evolutionary graph database, the number of events and relationships between events included in the global event evolutionary graph continues to increase, even reaching millions or even tens of millions. The events in the global event evolutionary graph come from massive historical news, reports, and other texts. Each event may also be associated with a plurality of texts, and the user needs to invest a lot of time to search the text corresponding to events or relationships between events.

On the other hand, history is always similar. Each event in the global event evolutionary graph may have occurred a plurality of times in history. Displaying the number of times and specific time of an event occurred in history intuitively can help the user feels the pattern of events. When searching the event evolutionary graph that the user is concerned about, if time factors are not considered, a chain of unreasonable events may appear, causing the user to obtain incorrect information.

A large-scale event evolutionary graph provides a basis for the user to search events, but the current searching and visualization methods are still relatively simple. Time factors are not considered in the searching process, and time factors-related information is not displayed to the user when presenting searching results.

In order to solve at least partially one or more of the above problems and other potential problems, embodiments of the present disclosure propose a scheme for information presenting. According to one or more embodiments, a query for the event evolutionary graph is received, the query indicating at least the target event to be searched. As a result of the query, a target event evolutionary graph comprising a plurality of nodes and at least one directed edge connecting the plurality of nodes is presented. These nodes represent the target event and one or more events associated with the target event respectively, and the directed edge represents an event relationship between events represented by connected nodes respectively. For at least one node of these nodes, the time information of an event represented by the node is presented respectively.

In embodiments of the present disclosure, while displaying the query result to the user, the time information of the events in the query result is also displayed. This can help the user deeply understand the time pattern of event occurrence. In this way, it can advantageously help the user understand the evolution pattern of events, thereby improving user experience.

Example Process for Constructing a Reference Event Evolutionary Graph

In order to better understand the presentation of the query result of the event evolutionary graph, an example process of constructing a reference event evolutionary graph as a search source is described firstly in the following. In this example process, the reference event evolutionary graph is constructed based on various media contents.

The media content can be any appropriate form of content that can provide information. For example, the media content can be a news report in the form of text, image, audio, video, or a combination thereof. The media content can be obtained from various platforms (e.g., news platforms) or stored. For media content in the form of text, information can be directly extracted from the text for constructing an event evolutionary graph. For media content in the form of image, video, audio, etc., information for constructing an event evolutionary graph can be extracted from image, audio, or video with any known or future developed technology. For example, relevant information can be directly extracted from image, video, or audio formats based on image recognition or speech recognition technology.

The electronic device 120 first generates an event evolutionary graph corresponding to a single media content, also referred to an individual event evolutionary graph. The individual event evolutionary graph is used to represent a relationship between events extracted from a single media content. For this purpose, the individual event evolutionary graph comprises a plurality of nodes, which represents a plurality of events extracted from the media content respectively. The individual event evolutionary graph also comprises at least one directed edge, which represents the event relationships between different events. The individual event evolutionary graph can then be used to update the reference event evolutionary graph.

Figure 2:
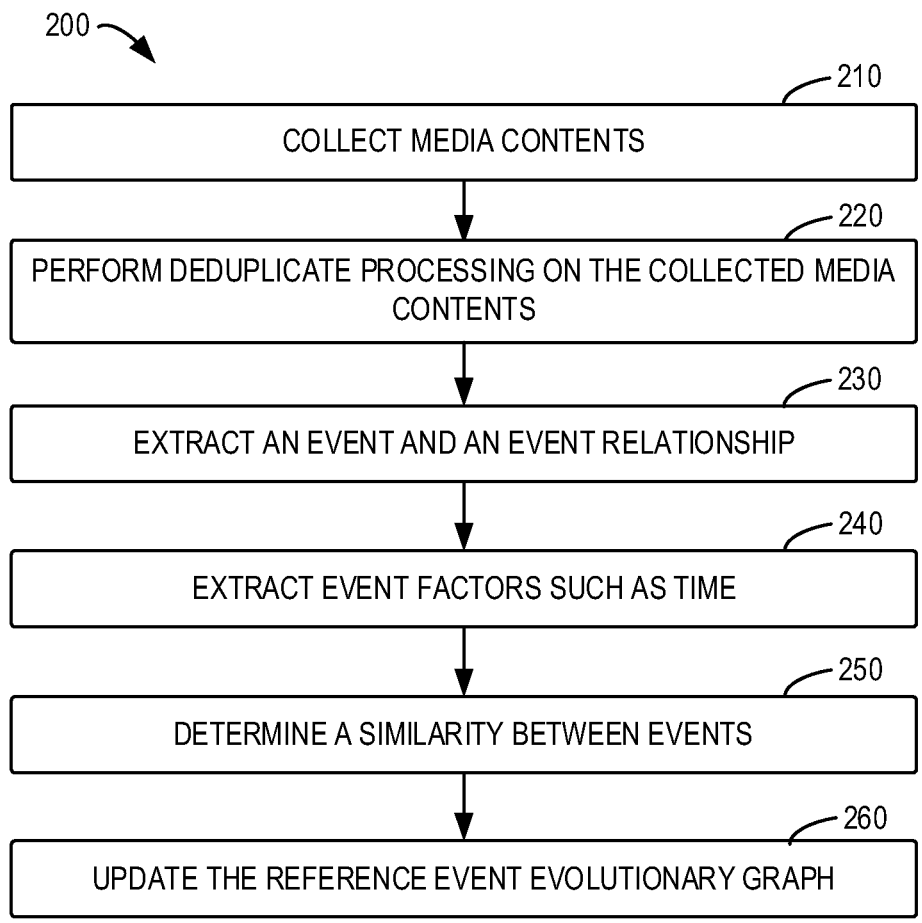
FIG. 2 illustrates a flowchart of a process of constructing a reference event evolutionary graph according to some embodiments of the present disclosure.

FIG. 2 illustrates a flowchart of a process 200 for constructing a reference event evolutionary graph in accordance with some embodiments of the present disclosure. The process 200 is described below as an example of implementing the construction of the reference event evolutionary graph at the electronic device 120, but this is merely exemplary and not intended to be limiting in any way.

At block 210, the electronic device 120 collects media contents. The media contents can comprise current affairs news, social news, popular science information, etc. Taking news as an example of media contents, the electronic device 120 can collect, based on the list of news websites, news regularly through the interface provided by the website. The list of news websites is, for example, mainstream news platforms, news platforms for specific industries, policy release platforms, knowledge-sharing platforms, etc. The list of news websites can also be specified by the user.

At block 220, the electronic device 120 performs deduplicate processing on the collected media contents. For example, the media contents can be current affairs news, to describe news collected from a list of news websites as an example. News from different news websites may have mutual references and reprints, making the collected news possibly repetitive. The electronic device 120 can filter the collected news based on a deduplicate algorithm.

In some embodiments, the electronic device 120 may adopt a Simhash algorithm to perform deduplicate processing on the collected media content. The deduplicate process may comprise steps such as word segmentation, calculating hash values, weighting, merging, dimensionality reduction, and deduplicating. Specifically, the electronic device 120 may perform word segmentation on text in the media content or text recognized or converted from the media content to obtain an effective feature vector, and then set weights for each feature vector. The electronic device 120 may compute the hash value of each feature vector through a hash function and set weights for each feature vector. The electronic device 120 may further weight the feature vectors based on the hash values of the feature vectors. Furthermore, the electronic device 120 may accumulate the weighted results of each feature vector to obtain a sequence string. The electronic device 120 judges each digit of the sequence string. For digits greater than 0, it is set to 1; for digits less than 0, it is set to 0. In this way, the electronic device 120 obtains a Simhash value corresponding to the media content. Finally, the electronic device 120 computes the hash distance between any two media content. If the hash distance is less than a predetermined threshold, the two media contents are considered duplicated. The electronic device 120 may remove one of the media contents, thereby implementing deduplicate processing.

It should be understood that the Simhash algorithm is merely one example. In embodiments of the present disclosure, any appropriate algorithm may be deployed to achieve deduplicate.

At block 230, the electronic device 120 extracts events and event relationships. Block 230 can be performed for any deduplicated media content or each media content. The electronic device 120 can automatically extract events and event relationships from the deduplicated media content based on an event extraction algorithm. One or more events can be extracted from a single media content. For a certain media content, events may not be extracted. The event relationships can comprise those event relationships described in FIG. 1 above. For example, in a news about "enriching feed sources to address the problem of rising feed prices leading to increased breeding costs", the electronic device 120 can extract a first event "feed price increasing", a second event "breeding cost increasing", and a causal relationship between the two events.

Additionally, in some embodiments, the electronic device 120 may further determine the degree of correlation with respect to the event relationship, which also referred to herein as correlation coefficients.

At block 230, any appropriate event extraction algorithm may be adopted to extract events and event relationships. Examples of event extraction algorithms may comprise, but are not limited to, a method of classification-based event extraction, a method of sequence-labeled event extraction, a method of reading comprehension-based event extraction, a method of generation-based event extraction, and the like. The scope of the present disclosure is not limited in this regard.

As an example, the electronic device 120 may deploy an event extraction algorithm based on sequence annotation to extract events and event relationships. Continuing with the example of news text, the electronic device 120 can preprocess the deduplicated news text, e.g., filtering excess spaces, and garbled characters, performing text segmentation, replacing interfering strings, and so on. The electronic device 120 can recognize the starting and ending positions of event by training a continuous event character sequence model on the preprocessed news text to obtain a descriptive fragment of the event, namely an event name. The event name usually comprises a trigger word of the event, the trigger word stipulates an event type of the event. Furthermore, the electronic device 120 can determine, based on the trigger word of the event, the event relationship between events, and then compute the degree of correlation between events.

At block 240, the electronic device 120 extracts event factors such as time. The electronic device 120 can extract event factors that the event has. Event factors can comprise but are not limited to event subject, event object, time, location, person, industry, company, and product. Depending on the amount of information in the media content, each event may have one or more event factors or no event factors. For example, extract the event "breeding cost increasing" and its corresponding event factors from a news text. The event factors of the event "breeding cost increasing" can comprise a time factor "Apr. 1, 2022", an industry factor "breeding industry", and a location factor "XX county". The electronic device 120 extracts at least the time factor of event and can additionally extract other factors. The time factor of the event can represent the time of the event. If the time factor of an event cannot be extracted from the media content, the publication time of the media content can be used as the time of the event.

Next, the electronic device 120 can generate an individual event evolutionary graph. Specifically, the electronic device 120 generates an individual event evolutionary graph based on the events and event relationships extracted at block 230. Continuing with the previous example regarding the breeding industry, the generated individual event evolutionary graph may comprise a node representing the first event "feed price increasing", a node representing the second event "breeding cost increasing", and a directed edge connected between these two nodes to represent the causal relationship between the two events. In this example, the directed edge points from the node representing the first event "feed price increasing" to the node representing the second event "breeding cost increasing".

Figure 3:
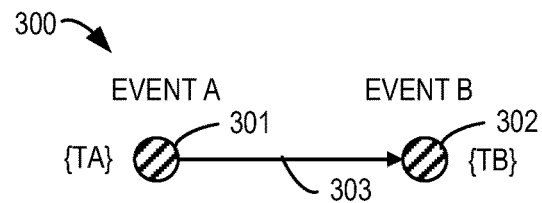
FIG. 3 illustrates a schematic diagram of associating a time factor to an individual event evolutionary graph according to some embodiments of the present disclosure.

Electronic device 120 can further associate event factors such as the time factor with corresponding events in the individual event evolutionary graph. For example, the time factor possessed by an event can be stored as an attribute of event Associated with the node representing the event. FIG. 3 illustrates a schematic diagram of associating a time factor with the individual event evolutionary graph according to some embodiments of the present disclosure. In the example of FIG. 3, the electronic device 120 extracts an event A represented by a node 301, an event B represented by a node 302, an event relationship between the event A and event B, and a time factor corresponding to each event from the media content.

Specifically, the electronic device 120 extracts a time TA of occurrence of the event A and a time TB of occurrence of the event B. Accordingly, the time TA is associated with the node 301 representing event A, and a time TB is associated with the node 302 representing event B.

The above reference describes an example process of constructing an individual event evolutionary graph. It should be understood that this is only exemplary, and the individual event evolutionary graph can be constructed in any appropriate manner in the embodiments of the present disclosure. In addition, the events, event relationships, event numbers, and event factors described above are only exemplary and are not intended to limit the scope of the present disclosure.

Continuing with reference to FIG. 2. At block 250, the electronic device 120 computes a similarity between events in the individual event evolutionary graph and events in the reference event evolutionary graph. The similarity can be computed based on event names, event factors, etc. As an example, the electronic device 120 can determine the similarity between events based on a Jaccard similarity. Continuing with the example of FIG. 3, the electronic device 120 compares event A in the individual event evolutionary graph with another event in the reference event evolutionary graph. The name and factors of event A are segmented to obtain a first segmentation set for event A. The electronic device 120 segments the names and factors of the events to be compared in the reference event evolutionary graph to obtain a second segmentation set. Based on the first segmentation set and the second segmentation set, the electronic device 120 determines the number of words in the intersection of the two sets and the number of words in the union of the two sets. Furthermore, the electronic device 120 computes the ratio of the number of words in the intersection to the number of words in the union to obtain the Jaccard similarity.

It should be understood that the Jaccard similarity described above is only one example of determining the similarity between events. In embodiments of the present disclosure, any appropriate method of similarity calculation may be used.

At block 260, the electronic device 120 updates the reference event evolutionary graph. Specifically, the electronic device 120 can deploy the individual event evolutionary graph to update the reference event evolutionary graph. Herein, updating the reference event evolutionary graph can also be referred to as fusing the individual event evolutionary graph with the reference event evolutionary graph. Fusion can refer to merging one or more nodes in the individual event evolutionary graph with one or more nodes in the reference event evolutionary graph or adding the individual event evolutionary graph itself to the reference event evolutionary graph as part of it. The specific operation is only exemplary and is not intended to limit the scope of this disclosure. Therefore, as compared to the reference event evolutionary graph or the global event evolutionary graph, the individual event evolutionary graph can be regarded as a subgraph of the event evolutionary graph.

The individual event evolutionary graph and the reference event evolutionary graph can be fused based on similarity. The electronic device 120 can fuse the individual event evolutionary graph and the reference event evolutionary graph based on a relationship between the value of similarity and one or more predetermined thresholds. In some embodiments, two thresholds may be predetermined, i.e., a first threshold and a second threshold, and the first threshold is greater than the second threshold. If the similarity between the two events compared is greater than the first threshold, the two events can be considered the same. Accordingly, the electronic device 120 can merge the nodes in the individual event evolutionary graph with the corresponding nodes in the reference event evolutionary graph without adding new nodes in the reference event evolutionary graph. The event occurrence time associated with the nodes in the individual event evolutionary graph will be added to or associated with the corresponding nodes in the reference event evolutionary graph.

If the similarity between two events is less than the second threshold, the two events can be considered independent of each other. Accordingly, the electronic device 120 adds nodes in the individual event evolutionary graph to the reference event evolutionary graph to implement the fusion of the graph. The event occurrence time associated with the nodes in the individual event evolutionary graph is also added to the reference event evolutionary graph accordingly.

If the similarity between two events is between the first and second thresholds, the two events can be considered as similar events. Accordingly, the electronic device 120 can add nodes in the individual event evolutionary graph to the reference event evolutionary graph and establish indications of similar relationships for similar events (e.g., represented by directed edges of different styles). The event occurrence time associated with the nodes in the individual event evolutionary graph is also added accordingly to the reference event evolutionary graph.

Figure 4A:
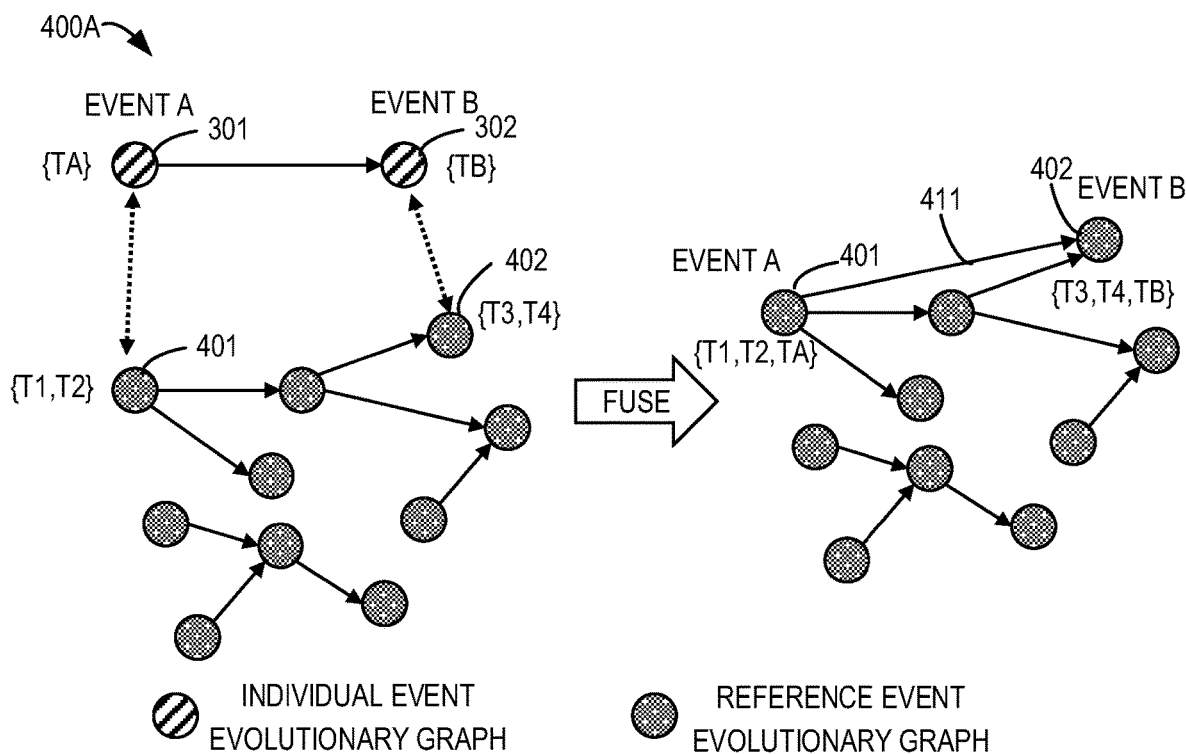
FIGS. 4A to 4C illustrate examples of updating a reference event evolutionary graph in accordance with some embodiments of the present disclosure.
Figure 4B:
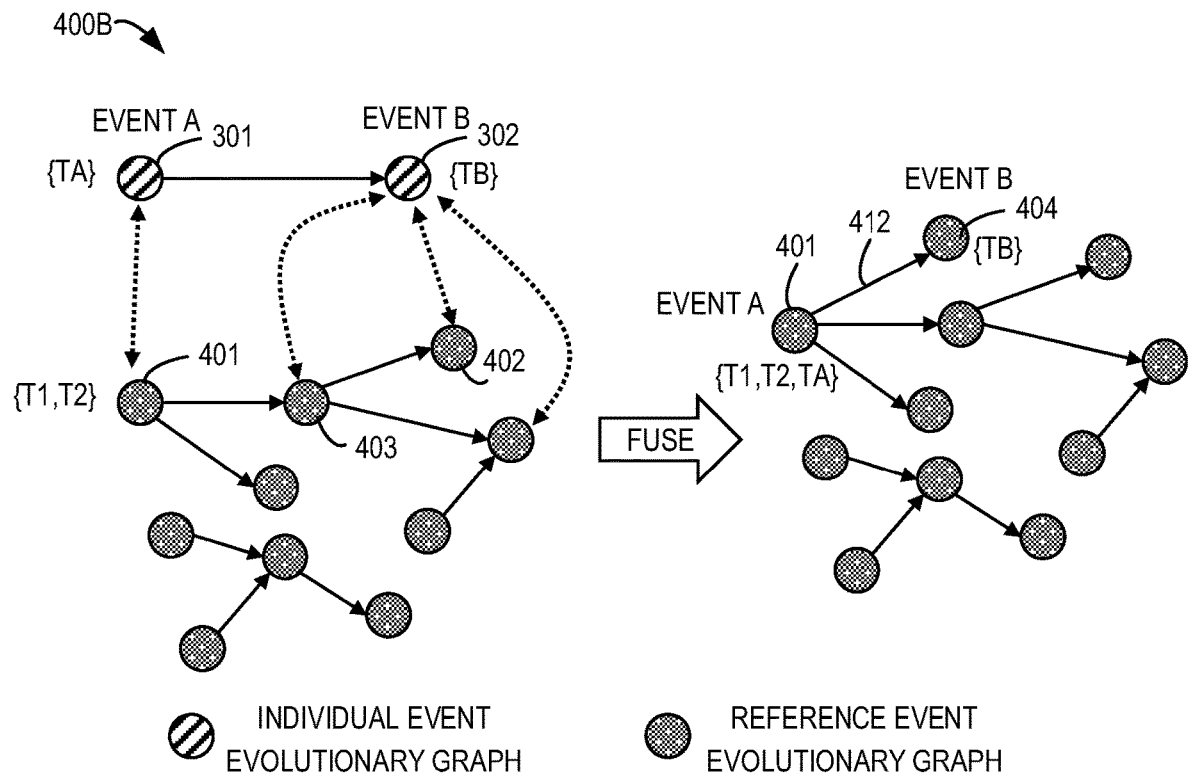
Figure 4C:
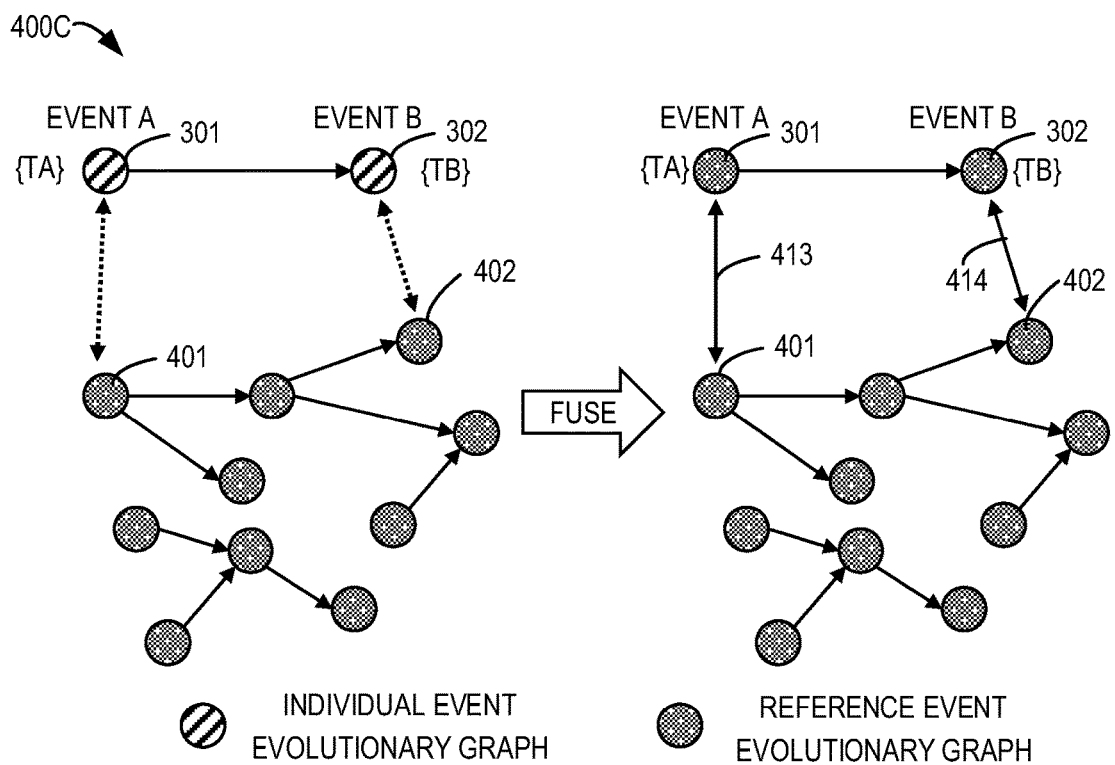

FIGS. 4A to 4C illustrate an example of updating the reference event evolutionary graph in accordance with some embodiments of the present disclosure.

In the example of FIG. 4A, the individual event evolutionary graph comprises the node 301 representing the event A and the node 302 representing event B. An occurrence time TA of the event A is stored in association with the node 301, and the occurrence time TB of the event B is stored in association with the node 302. The electronic device 120 performs traversal calculation of similarity between events A and B and each node is represented in the reference event evolutionary graph (dotted arrows are used in the figure to represent similarity calculation between the two events, but not all dotted arrows for traversal calculation are illustrated). The similarity between the event A and the event represented by a node 401 in the reference event evolutionary graph is greater than the first threshold (e.g., 0.9). The electronic device 120 fuses the node 301 with the node 401. Before fusion, event occurrence times T1 and T2 are stored in association with the node 401. After fusion, the occurrence time TA of the event A is also stored in association with the node 401. The similarity between the event B and the event represented by a node 402 in the reference event evolutionary graph is also greater than the first threshold (e.g., 0.9). The electronic device 120 fuses the node 302 with the node 402. Before fusion, event occurrence times T3 and T4 are stored in association with the node. After fusion, the occurrence time TB of the event B is also stored in association with the node 402. At the same time, in order to preserve an original relationship between the event A and event B, a directed edge 411 pointing from the node 401 to the node 402 is added to the reference event evolutionary graph. As shown in the figure, after fusion, no new nodes are added to the reference event evolutionary graph, but a directed edge between the event A and the event B and the occurrence time of events A and B are added.

In the example of FIG. 4B, the electronic device 120 performs a traversal calculation of similarity between the event A and the event B in the individual event evolutionary graph and each event in the reference event evolutionary graph (only part of the dashed arrow of the traversal calculation is illustrated in the figure). The similarity between the event A and the event represented by the node 401 in the reference event evolutionary graph is greater than the first threshold (e.g., 0.9). The electronic device 120 fuses the node 301 with the node 401. Before the fusion, event occurrence times T1 and T2 are stored in association with the node 401. After the fusion, the occurrence time TA of the event A is also stored in association with the node 401. The similarity between the event B and the event represented by each node in the reference event evolutionary graph is less than the second threshold (e.g., 0.6). The electronic device 120 adds a node 404 representing the event B to the reference event evolutionary graph and stores the occurrence time TB of the event B in association with the node 404. Accordingly, in order to preserve the original relationship between the event A and event B, a directed edge 412 pointing from the node 401 to the node 404 is added to the reference event evolutionary graph. After fusion, new nodes are added to the reference event evolutionary graph, directed edges between events A and B are added, and the occurrence times of events A and B.

In the example of FIG. 4C, the electronic device 120 performs a traversal calculation of similarity between the event A and the event B in the individual event evolutionary graph and each event in the reference event evolutionary graph (only part of the dashed arrow of the traversal calculation is shown in the figure). The similarity between the event A and the event represented by the node 401 in the reference event evolutionary graph is between the first threshold and second threshold. Accordingly, the electronic device 120 adds the node 301 to the reference event evolutionary graph and adds a directed edge 413 (which is a bidirectional edge) between the node 301 and the node 401 to indicate a similarity relationship between the event A and the event represented by the node 401. In the reference event evolutionary graph, the occurrence time TA of the event A is stored in association with the node 301. The similarity between the event B and the event represented by the node 402 in the reference event evolutionary graph is also between the first threshold and second threshold. Accordingly, the electronic device 120 adds the node 302 to the reference event evolutionary graph and adds a directed edge 414 (which is a bidirectional edge) between the node 302 and the node 402 to indicate a similarity relationship between the event B and the event represented by the node 402. In the reference event evolutionary graph, the occurrence time TB of the event B is stored in association with the node 302. After fusion, a new node is added to the reference event evolutionary graph, indications of similar relationships between event A and similar events and between event B and similar events are established respectively, and increasing the occurrence times of events A and B.

The updating process of the reference event evolutionary graph described above can be regarded as the incremental construction of the reference event evolutionary graph. Such incremental construction can be used for the initial creation of the reference event evolutionary graph or for incremental updates to the already created reference event evolutionary graph. By continuously fusing the newly added individual event evolutionary graph into the reference event evolutionary graph, the reference event evolutionary graph can be caused to be continuously updated. In this way, a rich and comprehensive event chain and event relationship network can be formed.

The above describes an example process of constructing a reference event evolutionary graph as a search source. However, it should be understood that the described process is only an example and is not intended to limit the scope of the present disclosure. In embodiments of the present disclosure, a reference event evolutionary graph with time information for events constructed by any appropriate method can be used.

Example of Presenting the Query Result

With the continuous expansion of the reference event evolutionary graph as a search source, the number of events and relationships between events included in the reference event evolutionary graph continues to increase, even reaching millions or even tens of millions. In order to facilitate the user to view the event evolutionary graph related to the events they are concerned about, and the event evolutionary graph can be searched based on a user-specified condition.

In order to determine the search condition, a user interface (UI) can be provided to the user for specifying the condition. A query for the event evolutionary graph can be received through interaction between the user and the UI. Such query indicates at least the target event to be searched, i.e., the event that the user is interested in or concerned about. In some embodiments, the query can also indicate the time range to be searched. The same event may exhibit different development processes at different times. For example, due to the influence of XX factor, the associated event of the YY event in 2022 presents a significant difference from the associated event of the previous event. Therefore, adding a time factor to the search condition is beneficial for focusing on the time range that the user is concerned about. Alternatively, or additionally, the query can indicate other search conditions, such as but not limited to regions and institutions.

Figure 5:
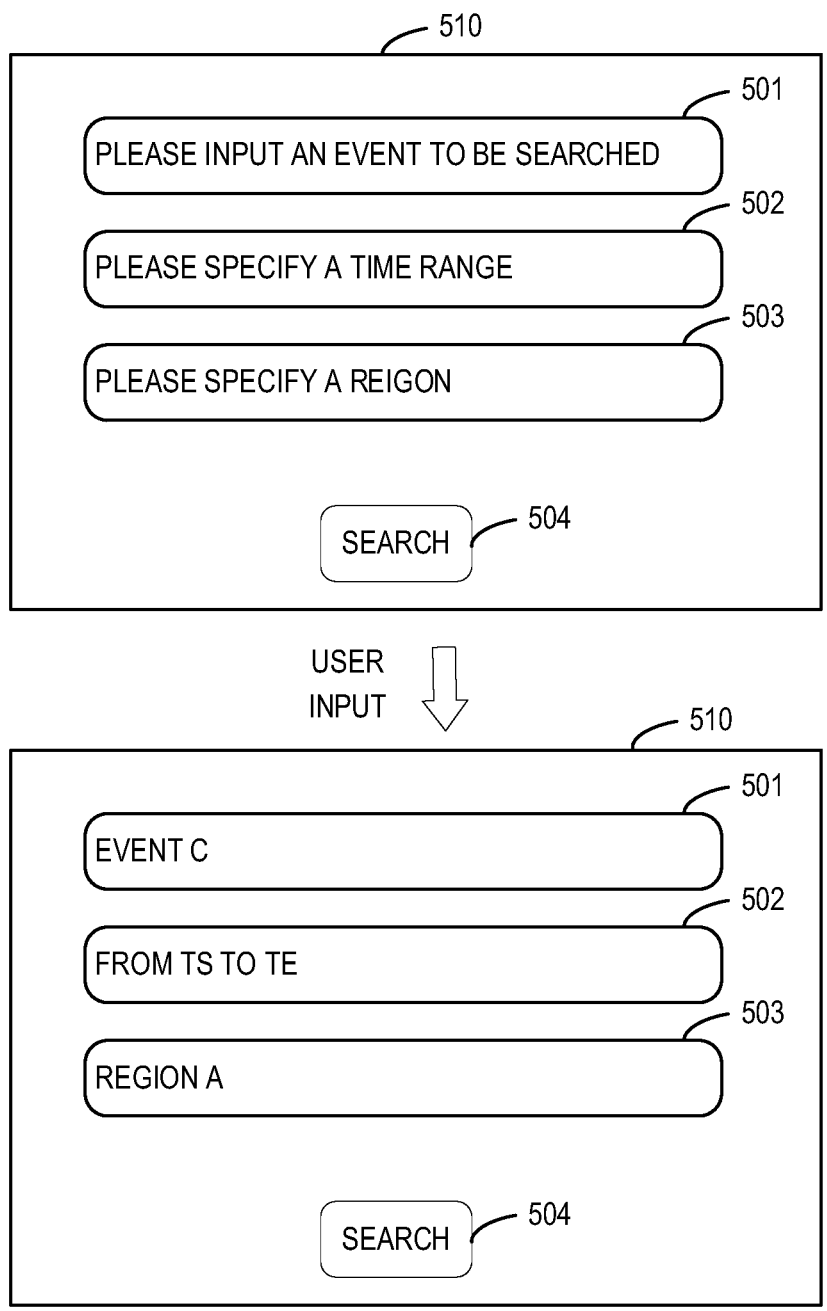
FIG. 5 illustrates a schematic diagram of a user interface in which a user specifies a search condition according to some embodiments of the present disclosure.

FIG. 5 illustrates a schematic diagram of a user interface in which a user specifies a search condition according to some embodiments of the present disclosure. For example, a UI 510 can be presented by an electronic device 150. Through the UI 510, the user can input one or more search conditions. In the example of FIG. 5, a UI area 501 is used for the user to input the event to be searched, i.e., to specify the target event. A UI area 502 is used for the user to input the time range of interest. A UI area 503 is used for the user to input the region, such as the region where the target event occurred.

As shown in FIG. 5, the user specifies an event C as the target event, specifies a time range from TS to TE, and specifies a region A. Then, the user can click the "Search" button 504 to submit a query for the event evolutionary graph.

It should be understood that the UI and search conditions shown in FIG. 5 are exemplary only and are not intended to limit the scope of the present disclosure. In embodiments of the present disclosure, any appropriate UI may be provided to the user to specify the query.

After the user submits the query, the electronic device 150 may search the reference event evolutionary graph to obtain the target event evolutionary graph as a result of the query. Alternatively or additionally, the electronic device 150 may send a request for the query to the electronic device 120, and accordingly, the electronic device 120 may search the reference event evolutionary graph to obtain the target event evolutionary graph as a result of the query. It will be appreciated that the target event evolutionary graph may be at least a part of the reference event evolutionary graph or determined based on at least a part of the reference event evolutionary graph.

In some embodiments, if the search condition comprises a time range, the time range is considered in the search such that the time information of the event represented in the target event evolutionary graph is within that time range. In other words, the event represented in the target event evolutionary graph occurs within that time range.

In some embodiments, the time information possessed by the reference event evolutionary graph can be further deployed during searching. Specifically, the time information of events can be used as a constraint during searching, so that the time order between different events with event relationships in the target event evolutionary graph conforms to the event relationships between them. In other words, event chains that do not logically conform to event relationships can be removed during searching.

Figure 6:
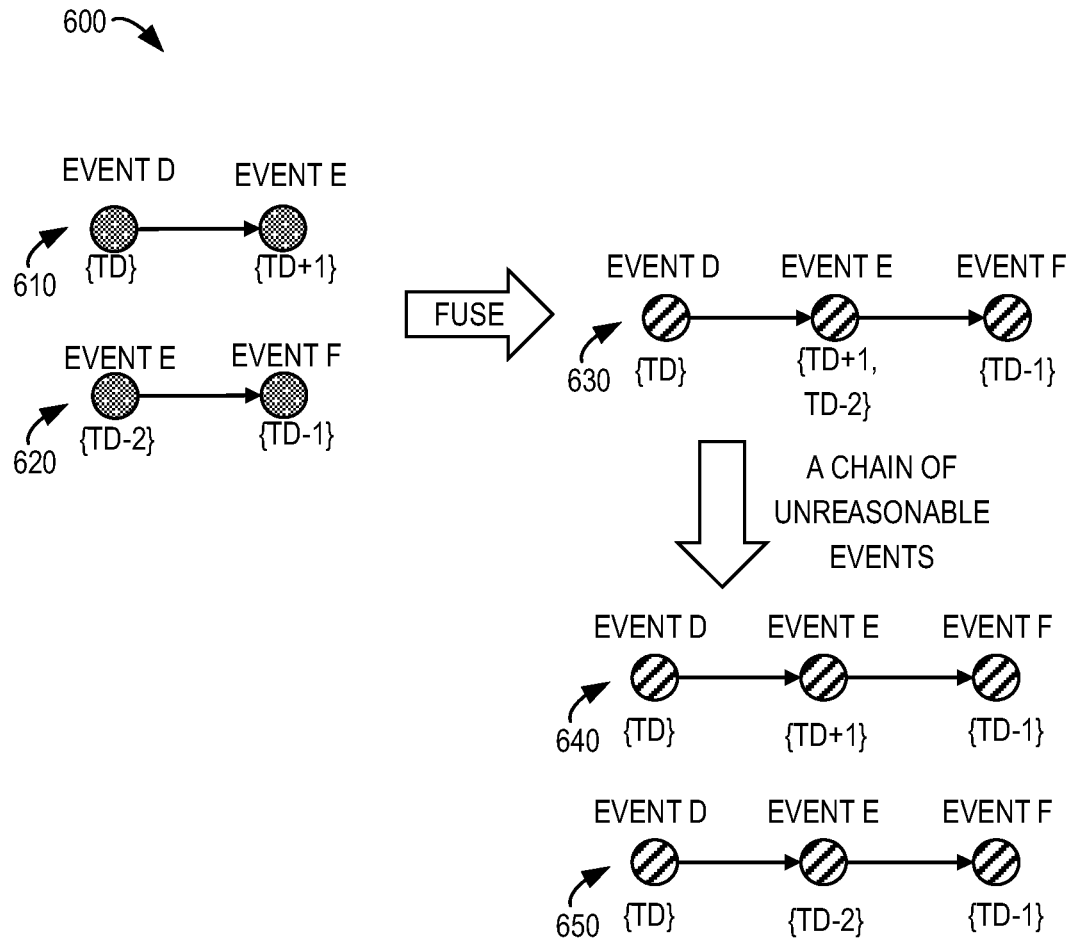
FIG. 6 illustrates a schematic diagram of removing a chain of unreasonable events according to some embodiments of the present disclosure.

FIG. 6 illustrates a schematic diagram of removing a chain of unreasonable events according to some embodiments of the present disclosure. As shown in FIG. 6, an individual event evolutionary graph 610 is generated based on a certain media content, the individual event evolutionary graph 610 representing an event relationship between an event D and an event. According to the media content, the event D has an occurrence time TD, while the event E has an occurrence time TD+1 later than TD. An individual event evolutionary graph 620 is generated based on another media content, which represents an event relationship between an event E and an event F, and according to the media content, the event E has an occurrence time TD−2, while the event F has an occurrence time TD−1. By the method of fusion described in FIGS. 4A to 4C above, a subgraph 630 is generated as part of the reference event evolutionary graph. Time information in the individual event evolutionary graphs 610 and 620 is also fused into the reference event evolutionary graph.

The arrows in the event evolutionary graph represent a relationship between two events, e.g., causality, succession, etc., which also implies a chronological relationship. When searching the event evolutionary graph based on user-set conditions, the time information of the event can be used as a constraint.

In the example of FIG. 6, according to subgraph 630, event chains 640 and 650 can be acquired. In the event chain 640, the occurrence time TD−1 of the event F is actually earlier than the occurrence time TD+1 of the event E. In other words, in this chain, the time sequence between the events E and F does not conform to the event relationship between the two. Similarly, in the event chain 650, the occurrence time TD−2 of the event E is actually earlier than the occurrence time TD of the event D. In other words, in this chain, the time sequence between the events E and D does not conform to the event relationship between the two. Therefore, the event chains 640 and 650 are a chain of unreasonable events and will not appear as results in the target event evolutionary graph associated with event D accordingly.

By using the time information of event as a constraint in the search, logical errors such as the occurrence time of the previous event being later than the subsequent event can be avoided, making the searched event chain more reasonable. In this way, the user can be provided with a more reasonable query result, thereby providing more accurate support for their subsequent decisions.

After obtaining the target event evolutionary graph, the electronic device 150 can present, as a result of the query, the target event evolutionary graph. The target event evolutionary graph comprises a plurality of nodes and at least one directed edge connecting these nodes. These nodes represent the target event and one or more events associated with the target event, and the directed edges represent the event relationship between the events represented by the connected nodes. For at least one of these nodes, the time information of the event represented by the node can be presented. In particular, time information can be presented for each node.

Figure 7A:
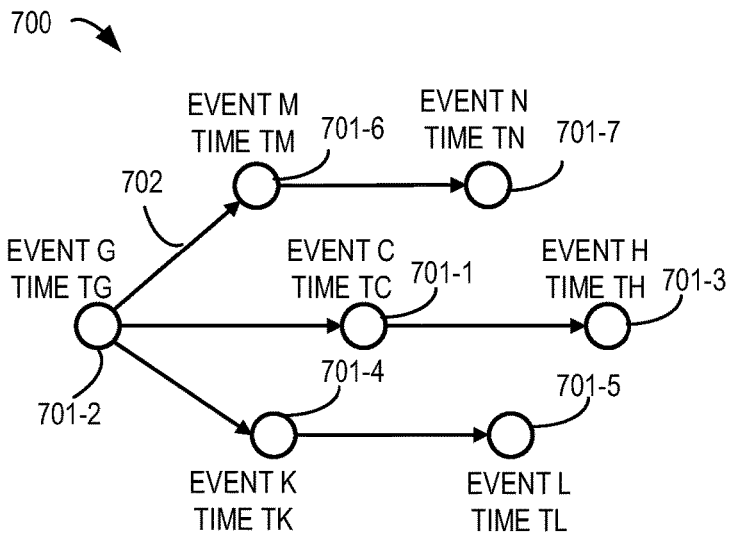
FIGS. 7A to 7D illustrate examples of visual presentation of a query result according to some embodiments of the present disclosure.

FIG. 7A illustrated an example of a visual presentation of a query result. The presented target event evolutionary graph 700 comprises a node 701-1 representing an event C, a node 701-2 representing an event G, a node 701-3 representing an event H, a node 701-4 representing an event K, a node 701-5 representing an event L, a node 701-6 representing an event M, and a node 701-7 representing an event N, which are also collectively referred to as a node 701. The target event evolutionary graph 700 also comprises a directed edge representing an event relationship, such as a directed edge 702 representing an event relationship between the event G and the event M.

For each node 701, the time information of the corresponding event represented is also presented, e.g., the occurrence time. Specifically, an occurrence time TC of the event C, an occurrence time TG of the event G, an occurrence time TH of the event H, an occurrence time TK of the event K, an occurrence time TL of the event L, an occurrence time TM of the event M, and an occurrence time TN of the event N are illustrated.

By illustrating the time information of the event in the query result, cause the user to understand the time interval between a preceding event and a subsequent event, to facilitate anticipating the trend of events and the occurrence time.

Users can interact with the presented target event evolutionary graph to obtain richer information. The event relationships in the graph are extracted from media content (e.g., news). In view of this, the source of the event relationship can be displayed to the user. In some embodiments, a selection of directed edges in the target event evolutionary graph can be received. Accordingly, one or more media contents that determine the event relationship represented by the directed edge can be presented, i.e., the source of the event relationship represented by the directed edge can be presented. If there are a plurality of media contents, they can be presented to the user at once or in a switchable manner.

Figure 7B:
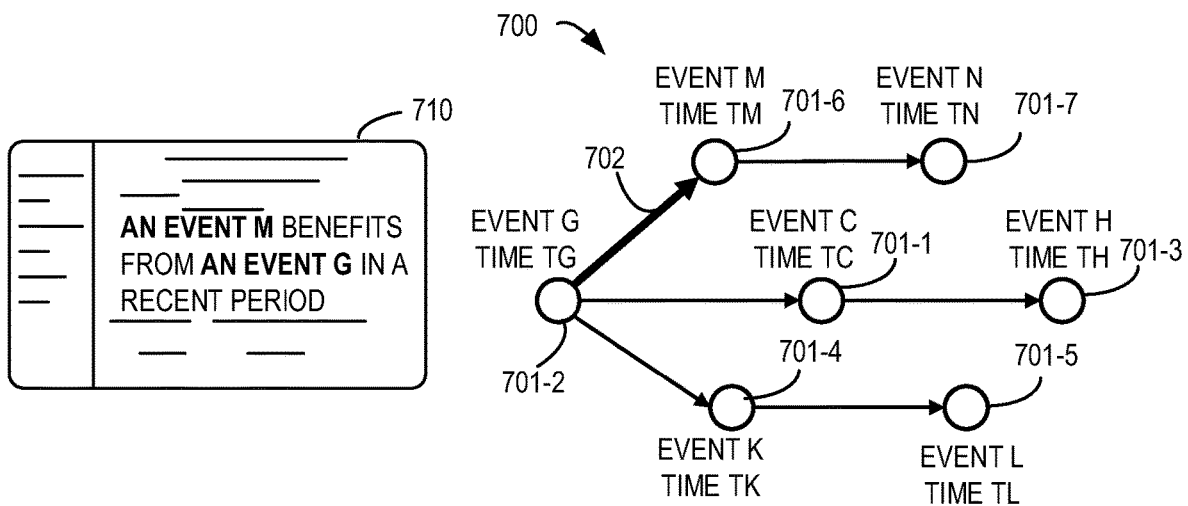

FIG. 7B illustrates an example presentation of a source of an event relationship. In this example, a directed edge 702 is selected, for example, when a user clicks on the directed edge 702. In response, a media content 710 is presented. In addition, the selected directed edge and text related to related events (in this example, the events M and G) in the media content are shown in highlight.

In such embodiments, the user can select a certain event relationship in the event evolutionary graph to obtain a news source of the event relationship. The event evolutionary graph itself is highly summarized. In this way, while viewing the event evolutionary graph, its source can be obtained, so that the user can have a specific and intuitive understanding of the event relationship of interest.

An event may occur a plurality of times in history. In view of this, in some embodiments, information related to the historical occurrence of the event can be provided to the user. Specifically, a selection of nodes in the presented event evolutionary graph can be received. In response, a time-of-occurrence distribution of the event represented by the selected node can be presented. The time-of-occurrence distribution indicates a frequency of a corresponding event during the historical time period. The range of the historical time period can be the same or different from the time range specified by the user in the search condition. In particular, in some embodiments, the range of the historical time period can be greater than the time range specified in the search condition. In this way, more comprehensive event information can be provided to the user.

Figure 7C:
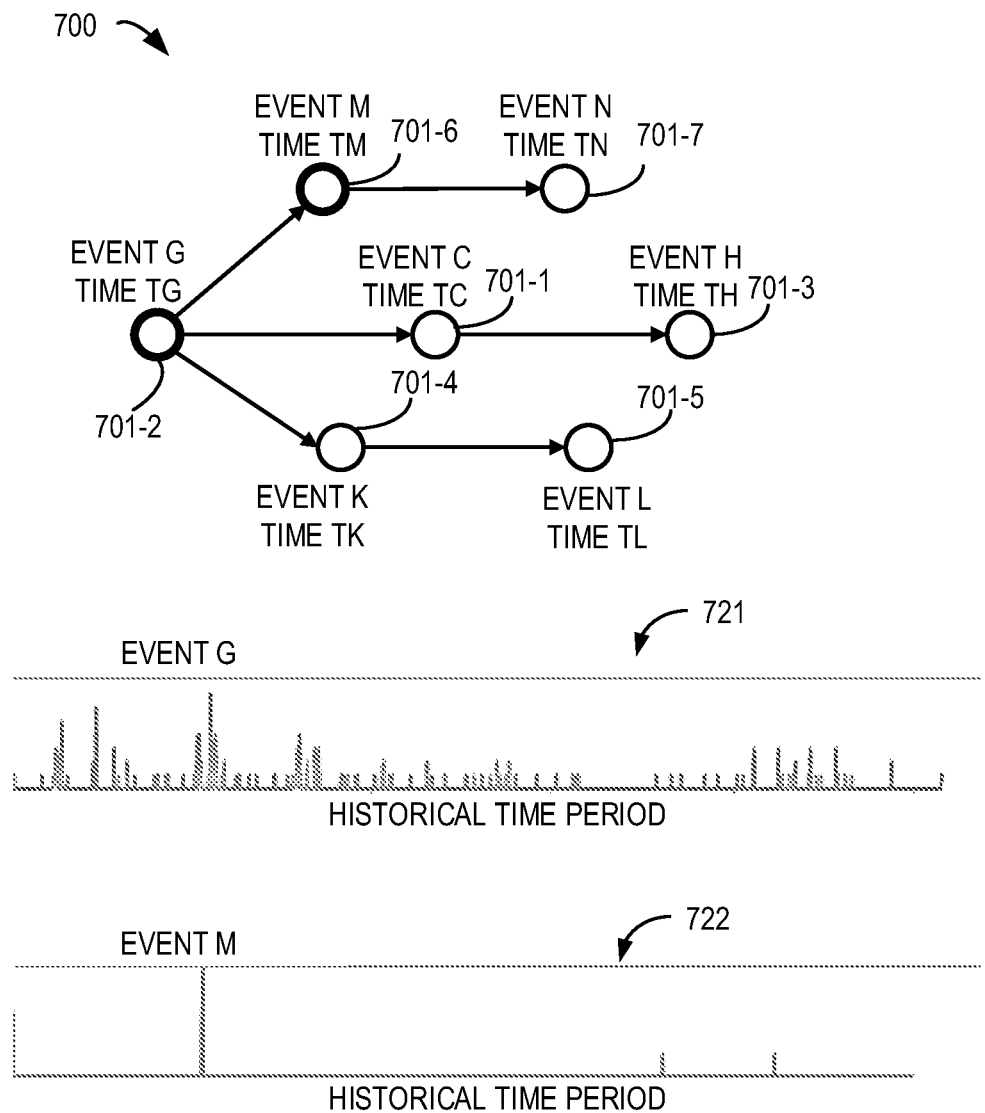

FIG. 7C illustrates an example presentation of the time-of-occurrence distribution. In this example, the node 701-2 representing the event G is selected. Accordingly, a time-of-occurrence distribution 721 of the event G is presented. In addition, the node 701-2 is shown in highlight. The node 701-6 representing the event M is selected. Accordingly, a time-of-occurrence distribution 722 of the event M is presented. The node 701-6 is also shown in highlight.

In such embodiments, the user can sequentially present a plurality of nodes and a time-of-occurrence distribution of corresponding event. The user can also select a plurality of nodes at once and present the time-of-occurrence distribution of corresponding event at the same time. By providing the time-of-occurrence distribution to the user, it is easy for the user to understand the distribution pattern of event occurrence time. In addition, when presenting the time-of-occurrence distribution of events with event relationships, the user can intuitively understand the degree of correlation between events. For example, for the example in FIG. 7C, by comparing the time-of-occurrence distribution 721 and 722, the user can understand that not every occurrence of the event G will lead to the occurrence of the event M.

Additionally, in some embodiments, interaction with the time-of-occurrence distribution can be implemented. For example, a user may be more concerned about one or more historical times and want to understand more about this historical time. In this case, for the time-of-occurrence distribution for a certain time, the user can select a time within the historical time period. The electronic device 150 can receive the selection of this time and present one or more media content as a source. i.e., the occurrence of event at this time is determined from the presented media content.

Figure 7D:
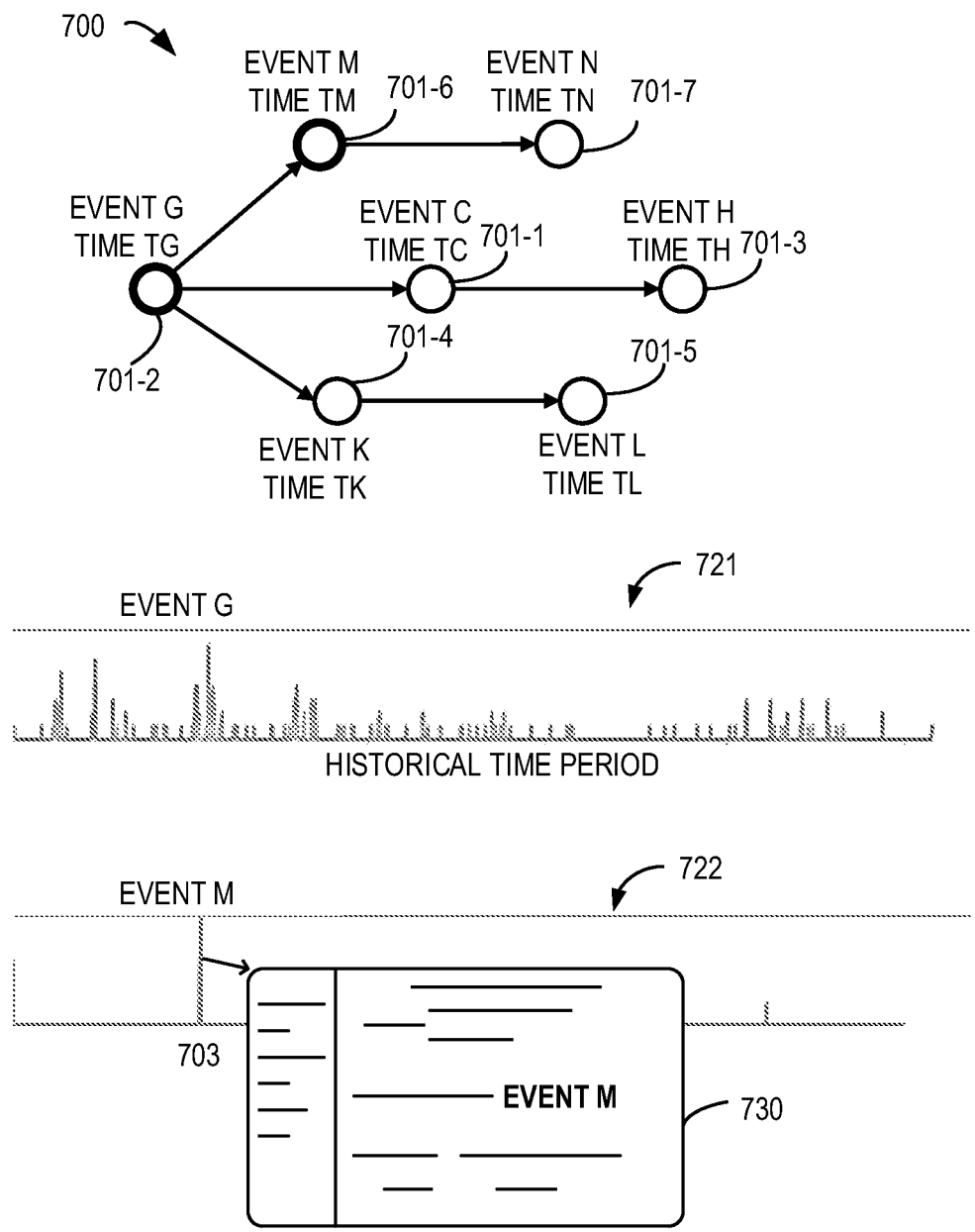

Referring to the example in FIG. 7D, the user expects to understand more details about the event M occurring at a time 703, thus selecting the time 703. Accordingly, the media content 730 as the source is presented. i.e., it is determined from the media content 720 that the event M occurred at the time 703. In this way, the user can obtain more information about the event of interest without further searching.

It should be understood that the target event evolutionary graph, media content, time-of-occurrence distribution, etc. shown in FIGS. 7A to 7D are only exemplary and are not intended to limit the scope of the present disclosure. In addition, although all elements are illustrated in the same schematic diagram in these examples, it should be understood that in practice, some of these elements may appear in different UIs.

Example Process

Figure 8:
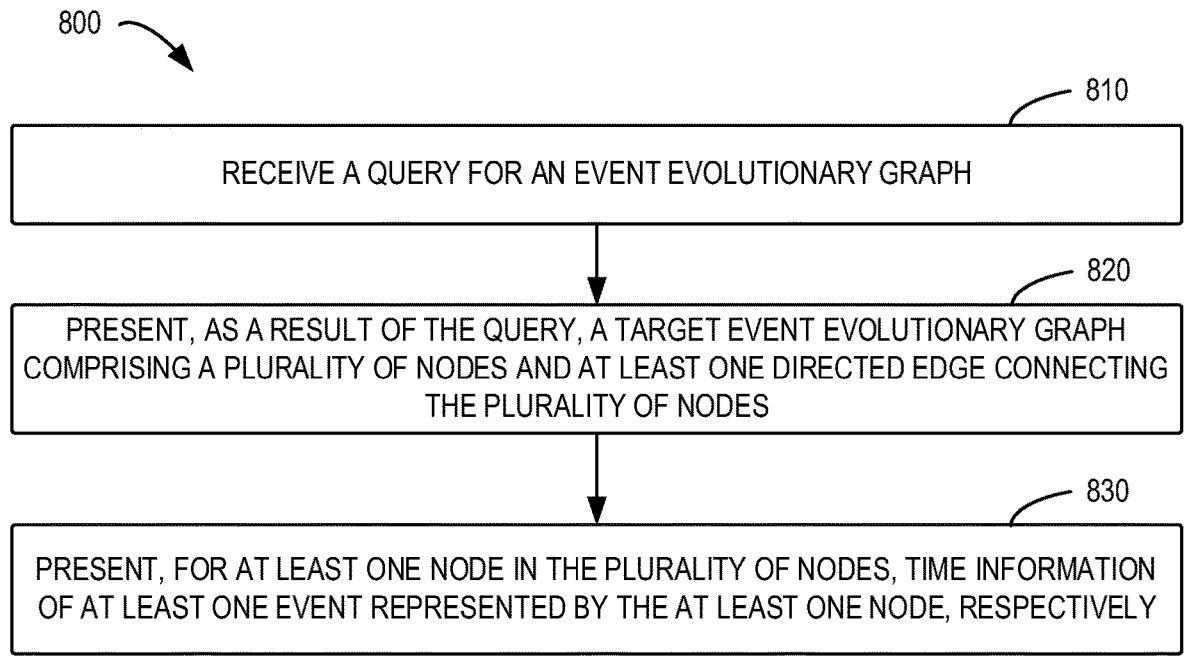
FIG. 8 illustrates a flowchart of a process of information presenting according to some embodiments of the present disclosure.

FIG. 8 illustrates a flowchart of a process 800 of information presenting according to some embodiments of the present disclosure. The process 800 may be implemented at least one of electronic device 150 or electronic device 120.

At block 810, the electronic device 150 receives a query for the event evolutionary graph. The query indicates at least a target event to be searched.

At block 820, electronic device 150 presents, as a result of the query, a target event evolutionary graph comprising a plurality of nodes and at least one directed edge connecting the plurality of nodes. The plurality of nodes represents the target event and one or more events associated with the target event respectively, and the at least one directed edge represents an event relationship between events represented by connected nodes respectively.

At block 830, the electronic device 150 presents, for at least one node in the plurality of nodes, time information of at least one event represented by the at least one node, respectively.

In some embodiments, in order to present the time information, the electronic device 150 may receive a selection of a first node of the plurality of nodes, the first node representing a first event. In response to the first node being selected, the electronic device 150 may present a time-of-occurrence distribution for the first event, the time-of-occurrence distribution indicating a frequency of occurrence of the first event over a historical time period.

In some embodiments, the electronic device 150 may receive a selection of a first time within a historical time period. in response to the first time being selected, the electronic device 150 may present one or more media content, occurrence of the first event at the first time being determined from the one or more media content.

In some embodiments, the electronic device 150 may receive a selection of a first directed edge of the at least one directed edge, the first directed edge representing a first event relationship. In response to the first directed edge being selected, the electronic device 150 may present one or more media content, the first event relationship being determined from the one or more media content.

In some embodiments, the electronic device 150 may present, for a second node in the plurality of nodes, a second time of occurrence of a second event represented by the second node. The electronic device 150 may present, for a third node in the plurality of nodes, a third time of occurrence of a third event represented by the third node. The second event has a second event relationship with the third event, and a time sequence between the second time and the third time conforms to the second event relationship.

In some embodiments, the query further indicates a time range to be searched, and a time comprised in the time information is within the time range.

In some embodiments, the target event evolutionary graph is determined based on a reference event evolutionary graph, and each node in the reference event evolutionary graph is associated with a time of occurrence of an event represented by the node.

In some embodiments, the reference event evolutionary graph is constructed by: generating an individual event evolutionary graph corresponding to a media content, the individual event evolutionary graph comprising at least a fourth node representing a fourth event, a fifth node representing a fifth event, and a third directed edge representing a third event relationship between the fourth event and the fifth event, the fourth event, the fifth event, and the third event relationship being determined from the media content; determining, based on the media content, a fourth time of occurrence of the fourth event and a fifth time of occurrence of the fifth event; determining a first similarity between the fourth event and a sixth event represented by a sixth node in the reference event evolutionary graph, and a second similarity between the fifth event and a seventh event represented by a seventh node in the reference event evolutionary graph; and updating the reference event evolutionary graph with the fourth time and the fifth time, based on the first similarity, the second similarity, a first threshold, and a second threshold less than the first threshold. The construction, for example, is performed by the electronic device 120.

In some embodiments, in order to update the reference event evolutionary graph, in response to the first similarity exceeding the first threshold and the second similarity exceeding the first threshold, a directed edge representing the third event relationship may be added between the sixth node and the seventh node. In association with the sixth node, the fourth time in the reference event evolutionary graph may be stored. In association with the seventh node, the fifth time in the reference event evolutionary graph may be stored.

In some embodiments, in order to update the reference event evolutionary graph, in response to the first similarity exceeding the first threshold and the second similarity being less than the second threshold, an eighth node representing the fifth event may be added into the reference event evolutionary graph. In association with the sixth node, the fourth time in the reference event evolutionary graph may be stored. In association with the eighth node, the fifth time in the reference event evolutionary graph may be stored.

In some embodiments, in order to update the reference event evolutionary graph, in response to the first similarity and the second similarity both being located between the first threshold and the second threshold, the individual event evolutionary graph may be added to the reference event evolutionary graph. An indication that the fourth event is similar to the sixth event and an indication that the fifth event is similar to the seventh event may be added to the reference event evolutionary graph. In association with the fourth node, the fourth time in the reference event evolutionary graph may be stored. In association with the fifth node, the fifth time in the reference event evolutionary graph may be stored.

Example Device

Figure 9:
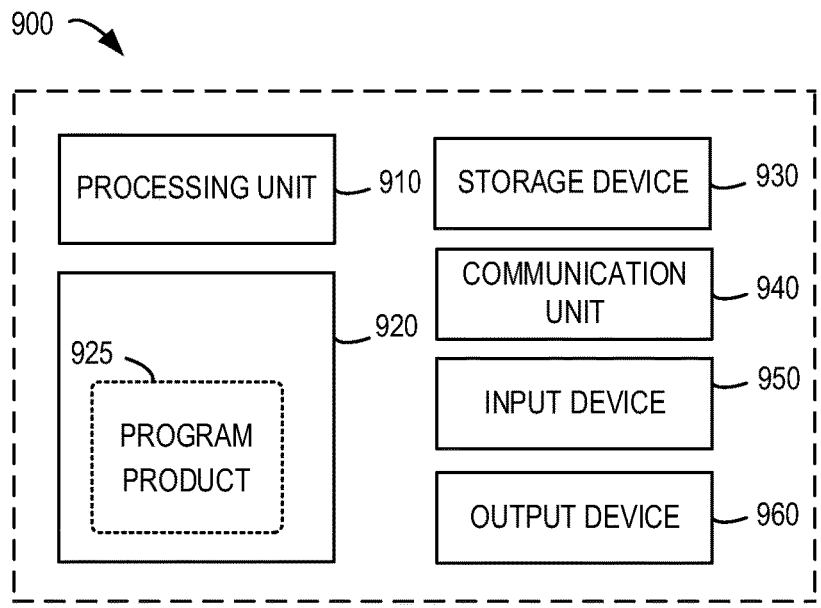
FIG. 9 illustrates a block diagram of an electronic device in which a plurality of embodiments of the present disclosure can be performed.

FIG. 9 illustrates a block diagram illustrating an electronic device 900 in which one or more embodiments of the present disclosure may be implemented. It should be understood that the electronic device 900 shown in FIG. 9 is merely exemplary and should not constitute any limitation on the functionality and scope of the embodiments described herein. The electronic device 900 illustrated in FIG. 9 can be used to implement the electronic device 120 or the electronic device 150 of FIG. 1.

As shown in FIG. 9, the electronic device 900 is in the form of a general-purpose electronic device. The components of the electronic device 900 may comprise, but are not limited to, one or more processors or processing units 910, memory 920, storage devices 930, one or more communication units 940, one or more input devices 950, and one or more output devices 960. The processing unit 910 may be actual or virtual processors and is capable of performing various processing according to programs stored in memory 920. In a multiprocessor system, a plurality of processing units executes computer-executable instructions in parallel to enhance a parallel processing capability of the electronic device 900.

The electronic device 900 typically comprises a plurality of computer storage media. Such media can be any obtainable media accessible to the electronic device 900, comprising but not limited to volatile and nonvolatile media, removable and non-removable media. The memory 920 can be volatile memory (e.g., a register, cache, random access memory (RAM)), nonvolatile memory (e.g., a read-only memory (ROM), electrically erasable programmable read-only memory (EEPROM), flash memory), or some combination thereof. The storage device 930 can be removable or non-removable media and can comprise machine-readable media e.g., a flash drive, disk, or any other media that can be used to store information and/or data (e.g., training data for training) and can be accessed within the electronic device 900.

The electronic device 900 may further comprise additional removable/non-removable, volatile/non-volatile storage media. Although not illustrated in FIG. 9, a disk drive for reading or writing from removable, non-volatile disks (e.g., "floppy disks") and an optical disk drive for reading or writing from removable, non-volatile optical discs may be provided. In these cases, each drive may be connected to a bus (not illustrated) by one or more data media interfaces. The memory 920 may comprise a computer program product 925 having one or more program modules configured to perform various methods or acts of various embodiments of the present disclosure.

The communication unit 940 implements communication with other electronic devices through a communication medium. Additionally, the functions of the components of the electronic device 900 may be implemented in a single computing cluster or in a plurality of computing machines that are capable of communicating through a communication connection. Therefore, the electronic device 900 may operate in a networking environment using logical connections to one or more other servers, a network personal computer (PC), or another network node.

The input device 950 can be one or more input devices, e.g., a mouse, keyboard, trackball, etc. The output device 960 can be one or more output devices, e.g., a display, speaker, printer, etc. The electronic device 900 can also communicate with one or more external devices (not illustrated) through the communication unit 940 as needed, e.g., a storage device, display device, etc., communicate with one or more devices that enable the user to interact with the electronic device 900 or communicate with any device (e.g., a network interface card, modem, etc.) that enables the electronic device 900 to communicate with one or more other electronic devices. Such communication can be performed via an input/output (I/O) interface (not illustrated).

According to an exemplary implementation of the present disclosure, there is provided a computer-readable storage medium having stored thereon computer-executable instructions, wherein the computer-executable instructions are executed by a processor to implement the methods described above. According to an exemplary implementation of the present disclosure, a computer program product is also provided, which is tangibly stored on a non-transitory computer readable medium and comprises computer executable instructions, the computer executable instructions, executed by a processor to implement the method described above.

Various aspects of the present disclosure are described herein with reference to flowcharts and/or block diagrams of a method, apparatus, device, and computer program product implemented in accordance with the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, special-purpose computer, or other programmable data processing device to produce a machine that, when executed by the processing unit of a computer or other programmable data processing device, produces an apparatus that implements the functions/actions specified in one or more blocks in the flowchart and/or block diagram. These computer-readable program instructions can also be stored in a computer-readable storage medium, which causes the computer, programmable data processing apparatus, and/or other device to operate in a specific manner. Therefore, the computer-readable medium storing the instructions comprises an article of manufacture that comprises instructions for implementing various aspects of the functions/actions specified in one or more blocks in the flowchart and/or block diagram.

Computer-readable program instructions can be loaded onto a computer, other programmable data processing apparatus, or other device to cause a series of operational steps to be performed on the computer, other programmable data processing device, or other device to produce a computer-implemented process, so that the instructions executed on the computer, other programmable data processing apparatus, or other device implement the functions/actions specified in one or more blocks in the flowchart and/or block diagram.

The flowcharts and block diagrams in the attached figures show the possible architecture, functions, and operations of the systems, methods, and computer program products implemented according to the present disclosure. In this regard, each block in the flowcharts or block diagrams can represent a module, program segment, or part of an instruction, which includes one or more executable instructions for implementing the specified logical functions. In some alternative implementations, the functions marked in the blocks can also occur in a different order than those marked in the figures. For example, two consecutive blocks can actually be executed in substantially parallel, and they can sometimes be executed in the opposite order, depending on the functions involved. It should also be noted that each block in the diagrams and/or flowcharts, as well as combinations of blocks in the diagrams and/or flowcharts, can be implemented using dedicated hardware-based systems that perform the specified functions or actions or can be implemented using a combination of dedicated hardware and computer instructions.

The above has described various implementations of the present disclosure. The above description is exemplary, not exhaustive, and is not limited to the various implementations disclosed. Without departing from the scope and spirit of the various implementations described, many modifications and changes are obvious to ordinary technicians in this field. The choice of terms used herein is intended to best explain the principles, practical applications, or improvements to the technology in the market, or to enable other ordinary technicians in this field to understand the various implementations disclosed herein.

We claim:

1. A method of information presenting, comprising:
   receiving a query for an event evolutionary graph, the query indicating at least a target event to be searched;
   presenting, as a result of the query, a target event evolutionary graph comprising a plurality of nodes and at least one directed edge connecting the plurality of nodes, the plurality of nodes representing the target event and one or more events associated with the target event respectively, and the at least one directed edge representing an event relationship between events represented by connected nodes respectively;
   presenting, for at least one node in the plurality of nodes, time information of at least one event represented by the at least one node, respectively;
   receiving a selection of a first node of the plurality of nodes, the first node representing a first event;
   in response to the first node being selected, presenting a time-of-occurrence distribution for the first event, the time-of occurrence distribution indicating a frequency of occurrence of the first event over a historical time period;
   receiving a selection of a first time within the historical time period; and
   in response to the first time being selected, presenting one or more media content, occurrence of the first event at the first time being determined from the one or more media content,
   wherein the method includes performing a deduplicating process on the one or more media content, and automatically extracting events and event relationships from the deduplicated one or more media content, wherein the query further indicates a time range to be searched, and a time included in the time information is within the time range.

2. The method of claim 1, further comprising:
   receiving a selection of a first directed edge of the at least one directed edge, the first directed edge representing a first event relationship; and
   in response to the first directed edge being selected, presenting the one or more media content, the first event relationship being determined from the one or more media content.

3. The method of claim 1, wherein presenting the time information comprises:
   presenting, for a second node in the plurality of nodes, a second time of occurrence of a second event represented by the second node; and presenting, for a third node in the plurality of nodes, a third time of occurrence of a third event represented by the third node;

wherein the second event has a second event relationship with the third event, and a time sequence between the second time and the third time conforms to the second event relationship.

4. The method of claim 1, wherein the target event evolutionary graph is determined based on a reference event evolutionary graph, and each node in the reference event evolutionary graph is associated with a time of occurrence of an event represented by the node.

5. The method of claim 4, wherein the reference event evolutionary graph is constructed by:

generating an individual event evolutionary graph corresponding to a media content, the individual event evolutionary graph comprising at least a fourth node representing a fourth event, a fifth node representing a fifth event, and a third directed edge representing a third event relationship between the fourth event and the fifth event, the fourth event, the fifth event, and the third event relationship being determined from the media content;

determining, based on the media content, a fourth time of occurrence of the fourth event and a fifth time of occurrence of the fifth event;

determining a first similarity between the fourth event and a sixth event represented by a sixth node in the reference event evolutionary graph, and a second similarity between the fifth event and a seventh event represented by a seventh node in the reference event evolutionary graph; and updating the reference event evolutionary graph with the fourth time and the fifth time, based on the first similarity, the second similarity, a first threshold, and a second threshold less than the first threshold.

6. The method of claim 5, wherein updating the reference event evolutionary graph comprises:

in response to the first similarity exceeding the first threshold and the second similarity exceeding the first threshold, adding, between the sixth node and the seventh node, a directed edge representing the third event relationship;

storing, in association with the sixth node, the fourth time in the reference event evolutionary graph; and storing, in association with the seventh node, the fifth time in the reference event evolutionary graph.

7. The method of claim 5, wherein updating the reference event evolutionary graph comprises:

in response to the first similarity exceeding the first threshold and the second similarity being less than the second threshold, adding an eighth node representing the fifth event into the reference event evolutionary graph;

adding, between the sixth node and the eighth node, a directed edge representing the third event relationship;

storing, in association with the sixth node, the fourth time in the reference event evolutionary graph; and storing, in association with the eighth node, the fifth time in the reference event evolutionary graph.

8. The method of claim 5, wherein updating the reference event evolutionary graph comprises:

in response to the first similarity and the second similarity both being located between the first threshold and the second threshold, adding the individual event evolutionary graph to the reference event evolutionary graph;

adding an indication that the fourth event is similar to the sixth event and an indication that the fifth event is similar to the seventh event to the reference event evolutionary graph;

storing, in association with the fourth node, the fourth time in the reference event evolutionary graph; and storing, in association with the fifth node, the fifth time in the reference event evolutionary graph.

9. An electronic device, comprising:

at least one processing circuit configured to perform acts comprising:

receiving a query for an event evolutionary graph, the query indicating at least a target event to be searched;

presenting, as a result of the query, a target event evolutionary graph comprising a plurality of nodes and at least one directed edge connecting the plurality of nodes, the plurality of nodes representing the target event and one or more events associated with the target event representing an event relationship between events represented by connected nodes respectively;

presenting, for at least one node in the plurality of nodes, time information of at least one event represented by the at least one node, respectively;

receiving a selection of a first node of the plurality of nodes, the first node representing a first event;

in response to the first node being selected, presenting a time-of-occurrence distribution for the first event, the time-of-occurrence distribution indicating a frequency of occurrence of the first event over a historical time period;

receiving a selection of a first time within the historical time period; and in response to the first time being selected, presenting one or more media content, occurrence of the first event at the first time being determined from the one or more media content, wherein the method includes performing a deduplicating process on the one or more media content, and automatically extracting events and event relationships from the deduplicated one or more media content, wherein the query further indicates a time range to be searched, and a time included in the time information is within the time range.

10. The device of claim 9, wherein the acts further comprise:

receiving a selection of a first directed edge of the at least one directed edge, the first directed edge representing a first event relationship; and in response to the first directed edge being selected, presenting the one or more media content, the first event relationship being determined from the one or more media content.

11. The device of claim 9, wherein presenting the time information comprises:

presenting, for a second node in the plurality of nodes, a second time of occurrence of a second event represented by the second node; and presenting, for a third node in the plurality of nodes, a third time of occurrence of a third event represented by the third node;

wherein the second event has a second event relationship with the third event, and a time sequence between the second time and the third time conforms to the second event relationship.

12. The device of claim 9, wherein the target event evolutionary graph is determined based on a reference event evolutionary graph, and each node in the reference event evolutionary graph is associated with a time of occurrence of an event represented by the node.

13. The device of claim 12, wherein the reference event evolutionary graph is constructed by:
   generating an individual event evolutionary graph corresponding to a media content, the individual event evolutionary graph comprising at least a fourth node representing a fourth event, a fifth node representing a fifth event, and a third directed edge representing a third event relationship between the fourth event and the fifth event, the fourth event, the fifth event, and the third event relationship being determined from the media content;
   determining, based on the media content, a fourth time of occurrence of the fourth event and a fifth time of occurrence of the fifth event;
   determining a first similarity between the fourth event and a sixth event represented by a sixth node in the reference event evolutionary graph, and a second similarity between the fifth event and a seventh event represented by a seventh node in the reference event evolutionary graph; and
   updating the reference event evolutionary graph with the fourth time and the fifth time, based on the first similarity, the second similarity, a first threshold, and a second threshold less than the first threshold.

14. A non-transitory computer readable storage medium having a computer program stored thereon, wherein the program, when executed by a processor, performs a method comprising:
   receiving a query for an event evolutionary graph, the query indicating at least a target event to be searched;
   presenting, as a result of the query, a target event evolutionary graph comprising a plurality of nodes and at least one directed edge connecting the plurality of nodes, the plurality of nodes representing the target event and one or more events associated with the target event respectively, and the at least one directed edge representing an event relationship between events represented by connected nodes respectively;
   presenting, for at least one node in the plurality of nodes, time information of at least one event represented by the at least one node, respectively;
   receiving a selection of a first node of the plurality of nodes, the first node representing a first event;
   in response to the first node being selected, presenting a time-of-occurrence distribution for the first event, the time-of-occurrence distribution indicating a frequency of occurrence of the first event over a historical time period;
   receiving a selection of a first time within the historical time period; and
   in response to the first time being selected, presenting one or more media content, occurrence of the first event at the first time being determined from the one or more media content,
   wherein the method includes performing a deduplicating process on the one or more media content, and automatically extracting events and event relationships from the deduplicated one or more media content, wherein the query further indicates a time range to be searched, and a time included in the time information is within the time range.

* * * * *